ROBERTS & DINGEE.
Velocipede.

No. 105,251. Patented July 12, 1870.

Witnesses:
Arthur Neill
Emil Moltz

Inventors:
Samuel D. Roberts
Montgomery Dingee

UNITED STATES PATENT OFFICE.

SAMUEL D. ROBERTS AND MONTGOMERY DINGEE, OF BROOKLYN, N. Y.

IMPROVEMENT IN DUMB-HORSE VELOCIPEDES.

Specification forming part of Letters Patent No. 105,251, dated July 12, 1870.

*To all whom it may concern:*

Be it known that we, SAMUEL D. ROBERTS and MONTGOMERY DINGEE, both of Brooklyn, Kings county, and State of New York, have invented a Dumb-Horse Velocipede, of which the following is a specification.

This invention relates to that class of velocipedes in which three wheels are employed, two of said wheels being in rear of a forward single wheel, and sustaining a seat for the rider, the forward wheel turning on a pivot for rounding sharp curves, and revolved by a crank-axle and the feet of the rider; but our invention differs from this class of velocipedes, inasmuch as that, instead of the forward wheel, which turns on a pivot, being employed to guide the velocipede in traveling round a curve, the hind wheels are pivoted and perform the office of the single front wheel in this particular; and this we accomplish by means of the reins, which are connected to levers attached to the horse's breast, and cords or chains connecting said levers with the hind axle, and with a spring-dog, which embraces said axle in such manner that, when the rider desires to turn his velocipede to the right or left hand, he pulls on the reins as though it were a live horse, raising the spring-dog from its hold on the axle, and throwing the axle and wheels into the desired position for rounding a curve, as we will further explain by reference to the accompanying drawings, in which—

Figure 1:
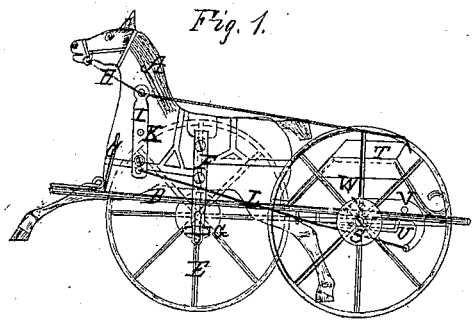
Figure 2:
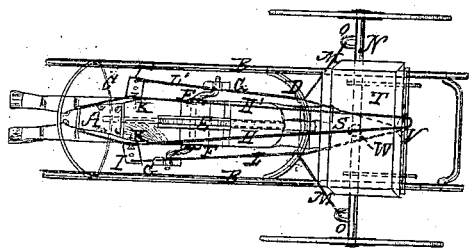
Figure 3:
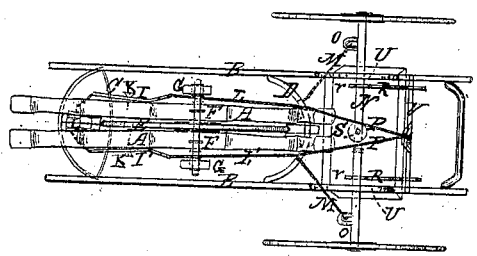
Figure 4:
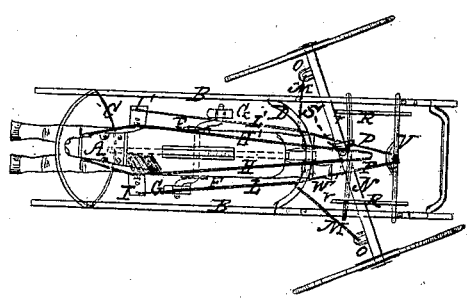

Figure 1 represents a side elevation of our dumb-horse velocipede; Fig. 2, a plan or top view; Fig. 3, an under side view, and Fig. 4 a top view with seat removed.

In the said drawings, A indicates the dummy-horse, attached to the shafts B B of the velocipede by a brace, C, through its breast, and another brace, D, connecting its hind legs with said shafts.

E is the forward single wheel, which rotates within the body of the horse, and whose axle is sustained in bearings F F, attached to the side of the horse, said axle having cranks G G, for the feet of the rider to revolve said wheel.

H H' is the bridle extending from the horse's head backward, and attached to levers I I', which have a common fulcrum, K, in the forward part of the horse.

L L' are cords or chains extending backward from the lower ends of the levers I I', each cord having one of its branches, M, attached to the hind axle, N, at O, and the other branch, P, attached to the spring-dog R, which holds, by its jaws $r$ $r'$, said hind axle, N, in position. (See Fig. 3.) The hind axle, N, turns laterally on a pivot, S, extending downward from the seat T, and swings in elongated loops U U under the shafts B B, the spring-dog R being also attached to said shafts by the swing-bar V, and to the axle N by the spring W.

Instead of the elongated loops U U being parallel, they may be segments of a circle described from the pivot S as a center; and pulleys on the hind shaft may be substituted for the staple-connection N of the branch rope with the axle, if preferred.

It will be seen that when it may be desired to turn the course of the velocipede—for instance, to the right hand—that by pulling on the right hand of the rein or bridle H', attached to the lever I', the cord P, attached to the said lever, will raise the dog R from the axle; while the cord M will pull the axle forward, throwing the right-hand wheel into the inner circle of the curve to be turned, and when the curve is turned by drawing on the left-hand rein H the velocipede will be again righted for a direct course, and vice versa.

What we claim is—

The bridle H H', levers I I', cords L L', with their branches M P, loops U U, and spring-dog R $r$ $r'$ of a three-wheeled velocipede, all arranged and operating substantially as and for the purposes described and set forth.

In testimony whereof we have hereunto set our signatures this 27th day of April, 1870.

SAMUEL D. ROBERTS.
MONTGOMERY DINGEE.

Witnesses:
ARTHUR NEILL,
EMILE MOLTZ.